US009817589B2

(12) United States Patent
Paveza et al.

(10) Patent No.: US 9,817,589 B2
(45) Date of Patent: Nov. 14, 2017

(54) VOLUME INTEGRITY IN A SHARED-RESOURCE ENVIRONMENT

(71) Applicant: International Business Machines Corporation, Armonk, NY (US)

(72) Inventors: John R. Paveza, Morgan Hill, CA (US); Dale F. Riedy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 14/848,218

(22) Filed: Sep. 8, 2015

(65) Prior Publication Data

US 2017/0068471 A1    Mar. 9, 2017

(51) Int. Cl.
    G06F 3/06    (2006.01)

(52) U.S. Cl.
    CPC ............ G06F 3/0619 (2013.01); G06F 3/065 (2013.01); G06F 3/067 (2013.01); G06F 3/0665 (2013.01)

(58) Field of Classification Search
    CPC ........ G06F 3/06; G06F 3/0619; G06F 3/0665; G06F 3/067; G06F 3/065
    See application file for complete search history.

(56) References Cited

U.S. PATENT DOCUMENTS

| 6,662,198 | B2 | 12/2003 | Satyanarayanan et al. |
| 7,111,194 | B1 | 9/2006 | Schoenthal et al. |
| 8,332,365 | B2 | 12/2012 | McAlister et al. |
| 8,762,681 | B2 | 6/2014 | Banzhaf et al. |
| 9,021,296 | B1 | 4/2015 | Kiselev et al. |
| 9,146,790 | B1* | 9/2015 | Dash ...................... G06F 11/00 |
| 2013/0198868 | A1 | 8/2013 | Georgiev |
| 2013/0311659 | A1* | 11/2013 | Curran ................ H04L 67/1097 709/225 |
| 2014/0122795 | A1 | 5/2014 | Chambliss |
| 2017/0068450 | A1 | 3/2017 | Candelaria et al. |

OTHER PUBLICATIONS

Candelaria et al., U.S. Appl. No. 14/848,229, filed Sep. 8, 2015.
List of IBM Patents or Patent Applications Treated as Related.
Anonymous, "Method to enable data integrity check at secondary site during Replication," IP.com Prior Art Database Technical Disclosure, Mar. 11, 2013, pp. 1-7.
Scheuermann et al., "On Storage Structures and Their Transformations," IP.com Prior Art Database Technical Disclosure, Mar. 30, 2007, (original publication date: Jun. 30, 1975), 23 pages.
Paveza et al., U.S. Appl. No. 15/682,286, filed Aug. 21, 2017.

* cited by examiner

Primary Examiner — David X Yi
Assistant Examiner — Zubair Ahmed
(74) Attorney, Agent, or Firm — Zilka-Kotab, P.C.

(57) ABSTRACT

A computer-implemented method includes receiving, utilizing a processor, a fencing command at a storage controller from an initiating host system. The fencing command identifies a shared volume. Additionally, the computer-implemented method includes determining which other host systems are connected to the shared volume, and fencing each of the other host systems connected to the shared volume by setting a fencing indicator for each of the other host systems. Still yet, the computer-implemented method includes sending a notification to each of the other host systems that have been fenced, and receiving an unfencing command from at least one of the other host systems that have been fenced.

20 Claims, 6 Drawing Sheets

VOLUME INTEGRITY IN A SHARED-RESOURCE ENVIRONMENT

BACKGROUND

The present invention relates to computing environments including shared resources, and more specifically, this invention relates to maintaining the integrity of a shared volume.

In environments where a shared resource, such as a storage volume, is accessible to multiple host systems, some host-initiated operations may transform the resource in a fundamental way. When one of these operations is performed by one of the connected host systems, it may be necessary to render the shared resource unavailable to the other connected host systems. In other words, some action may be performed to make the shared resource unavailable for use to applications on the other connected host systems. In one particular example, on a host system running z/OS, a VARY command may be issued to vary the shared resource offline to z/OS.

If the shared resource remains available to one or more host systems during the operation, then data corruption or undetected data loss can occur.

In some use cases, such as Hierarchical Storage Management (HSM) Fast Replication Backup, a shared volume may remain online because it is expensive to vary numerous devices offline/online to a host system that will then back up the shared volume to tape.

Additionally, after performance of the operation completes, the shared resource may then again be made available to the host systems. If a host system that is unaware of the operation attempts to write to data sets that have been moved as a result of the operation, then the effects of the operation may be lost, and/or a file directory may become corrupted.

BRIEF SUMMARY

In one general embodiment, a computer program product is provided for maintaining volume integrity in a shared-resource environment. The computer program product comprises a computer readable storage medium having program instructions embodied therewith. The program instructions are executable by a storage controller to cause the storage controller to receive a fencing command that identifies a shared volume, and determine which other host systems are connected to the shared volume. The program instructions are further executable by the storage controller to cause the storage controller to fence each of the other host systems connected to the shared volume by setting a fencing indicator for each of the other host systems, and send a notification to each of the other host systems that have been fenced. Additionally, the program instructions are executable by the storage controller to cause the storage controller to receive an unfencing command from at least one of the other host systems that have been fenced.

In another general embodiment, a computer-implemented method includes receiving, utilizing a processor, a fencing command at a storage controller from an initiating host system. The fencing command identifies a shared volume. Additionally, the computer-implemented method includes determining which other host systems are connected to the shared volume, and fencing each of the other host systems connected to the shared volume by setting a fencing indicator for each of the other host systems. Still yet, the computer-implemented method includes sending a notification to each of the other host systems that have been fenced, and receiving an unfencing command from at least one of the other host systems that have been fenced.

In another general embodiment, a system comprises a processor and logic integrated with and/or executable by the processor. The logic is configured to cause the processor to receive, at a storage controller from an initiating host system, a fencing command that identifies a shared volume, and determine which other host systems are connected to the shared volume. The logic is also configured to cause the processor to fence each of the other host systems connected to the shared volume by setting a fencing indicator for each of the other host systems. Moreover, the logic is configured to cause the processor to send a notification to each of the other host systems that have been fenced, and receive an unfencing command from at least one of the other host systems that have been fenced.

In another general embodiment, a computer program product is provided for maintaining volume integrity in a shared-resource environment. The computer program product comprises a computer readable storage medium having program instructions embodied therewith. The program instructions are executable by a processor to cause the processor to perform a transforming operation on a shared volume, and send a fencing command to a storage controller of the shared volume. Also, the program instructions are executable by the processor to cause the processor to receive, from the storage controller, a message indicating a status of the fencing command.

In another general embodiment, a computer program product is provided for maintaining volume integrity in a shared-resource environment. The computer program product comprises a computer readable storage medium having program instructions embodied therewith. The program instructions are executable by a processor to cause the processor to receive, at a host system, a notification from a storage controller, the notification indicating that the host system has been fenced from a shared volume. Additionally, the program instructions are executable by the processor to cause the processor to refresh a view of the shared volume, and send an unfencing command to the storage controller.

Other aspects and embodiments of the present invention will become apparent from the following detailed description, which, when taken in conjunction with the drawings, illustrate by way of example the principles of the invention.

DETAILED DESCRIPTION

Figure 1:
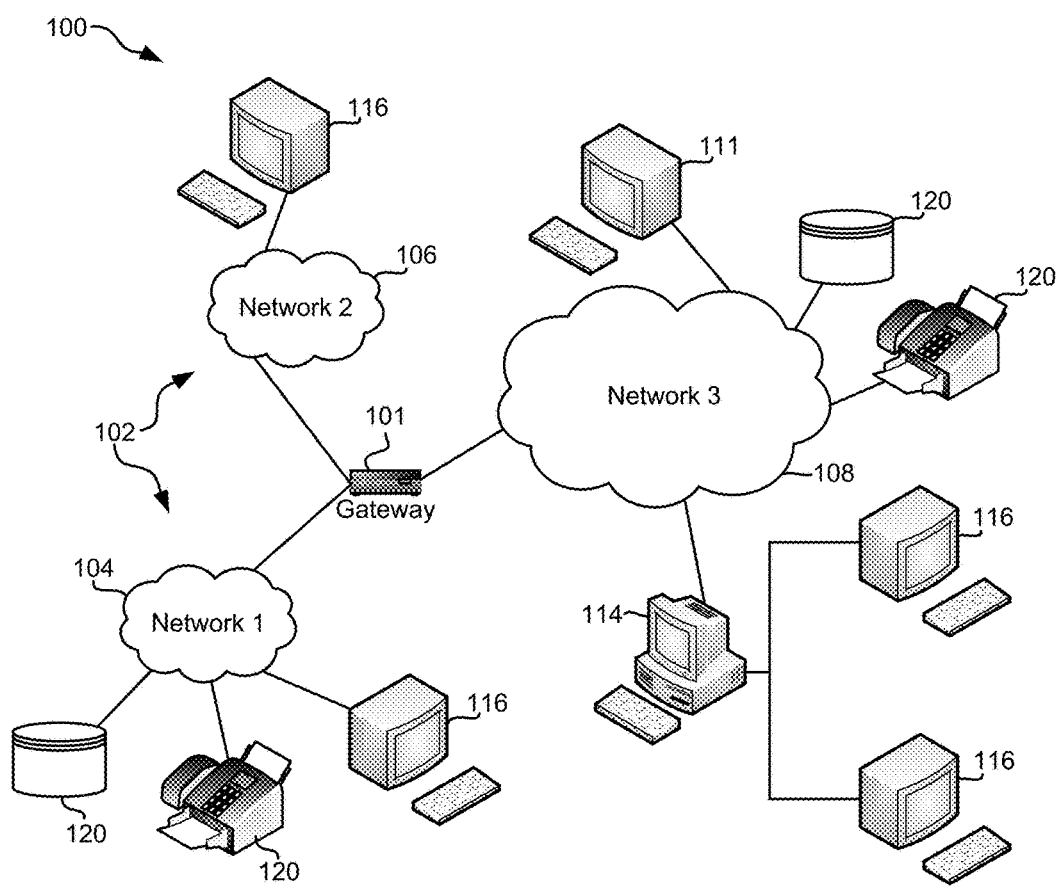
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for maintaining volume integrity in a shared-resource environment.

Various embodiments disclosed herein provide systems, methods, and computer program products for preventing host systems from accessing a shared resource after the shared resource has been modified in some manner by an initiating host system. In particular, a storage controller may receive a command sent by an initiating host system that has modified a shared volume. Thereafter, the storage controller may prevent other host systems from accessing the shared volume until the other host systems have recovered the shared volume in some manner. For example, the other host systems may need to refresh a view of the shared volume, validate the shared volume, and/or refresh in-memory information regarding the shared volume. As a result, data corruption and data loss may be prevented on a volume in a shared-resource environment.

In one general embodiment, a computer program product is provided for maintaining volume integrity in a shared-resource environment. The computer program product comprises a computer readable storage medium having program instructions embodied therewith. The program instructions are executable by a storage controller to cause the storage controller to receive a fencing command that identifies a shared volume, and determine which other host systems are connected to the shared volume. The program instructions are further executable by the storage controller to cause the storage controller to fence each of the other host systems connected to the shared volume by setting a fencing indicator for each of the other host systems, and send a notification to each of the other host systems that have been fenced. Additionally, the program instructions are executable by the storage controller to cause the storage controller to receive an unfencing command from at least one of the other host systems that have been fenced.

In another general embodiment, a computer-implemented method includes receiving, utilizing a processor, a fencing command at a storage controller from an initiating host system. The fencing command identifies a shared volume. Additionally, the computer-implemented method includes determining which other host systems are connected to the shared volume, and fencing each of the other host systems connected to the shared volume by setting a fencing indicator for each of the other host systems. Still yet, the computer-implemented method includes sending a notification to each of the other host systems that have been fenced, and receiving an unfencing command from at least one of the other host systems that have been fenced.

In another general embodiment, a system comprises a processor and logic integrated with and/or executable by the processor. The logic is configured to cause the processor to receive, at a storage controller from an initiating host system, a fencing command that identifies a shared volume, and determine which other host systems are connected to the shared volume. The logic is also configured to cause the processor to fence each of the other host systems connected to the shared volume by setting a fencing indicator for each of the other host systems. Moreover, the logic is configured to cause the processor to send a notification to each of the other host systems that have been fenced, and receive an unfencing command from at least one of the other host systems that have been fenced.

In another general embodiment, a computer program product is provided for maintaining volume integrity in a shared-resource environment. The computer program product comprises a computer readable storage medium having program instructions embodied therewith. The program instructions are executable by a processor to cause the processor to perform a transforming operation on a shared volume, and send a fencing command to a storage controller of the shared volume. Also, the program instructions are executable by the processor to cause the processor to receive, from the storage controller, a message indicating a status of the fencing command.

In another general embodiment, a computer program product is provided for maintaining volume integrity in a shared-resource environment. The computer program product comprises a computer readable storage medium having program instructions embodied therewith. The program instructions are executable by a processor to cause the processor to receive, at a host system, a notification from a storage controller, the notification indicating that the host system has been fenced from a shared volume. Additionally, the program instructions are executable by the processor to cause the processor to refresh a view of the shared volume, and send an unfencing command to the storage controller.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
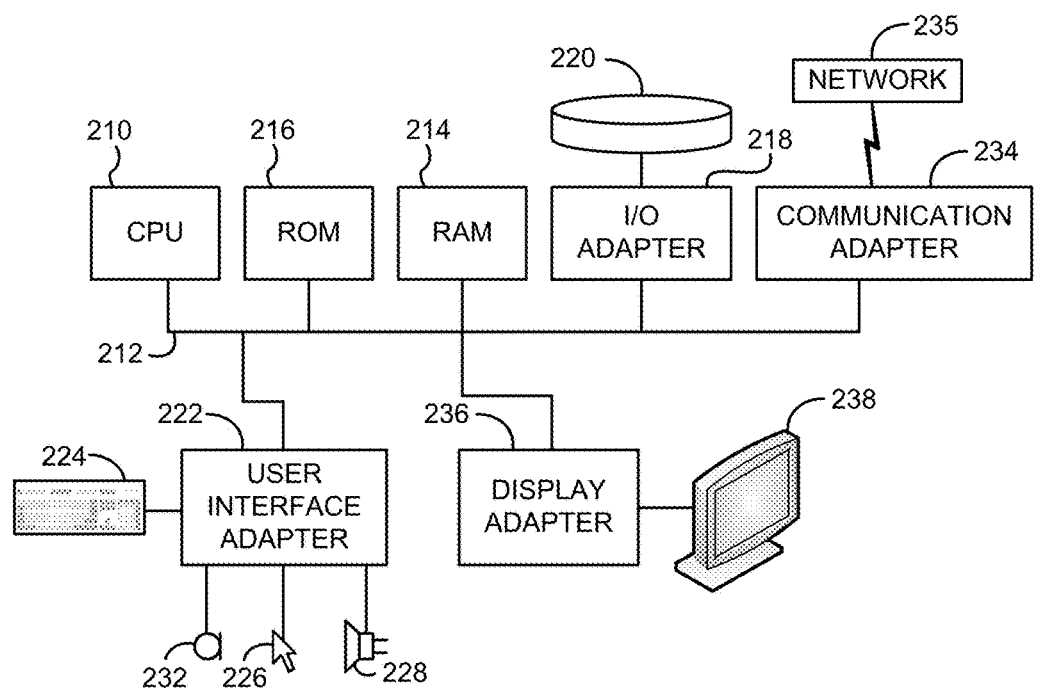
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
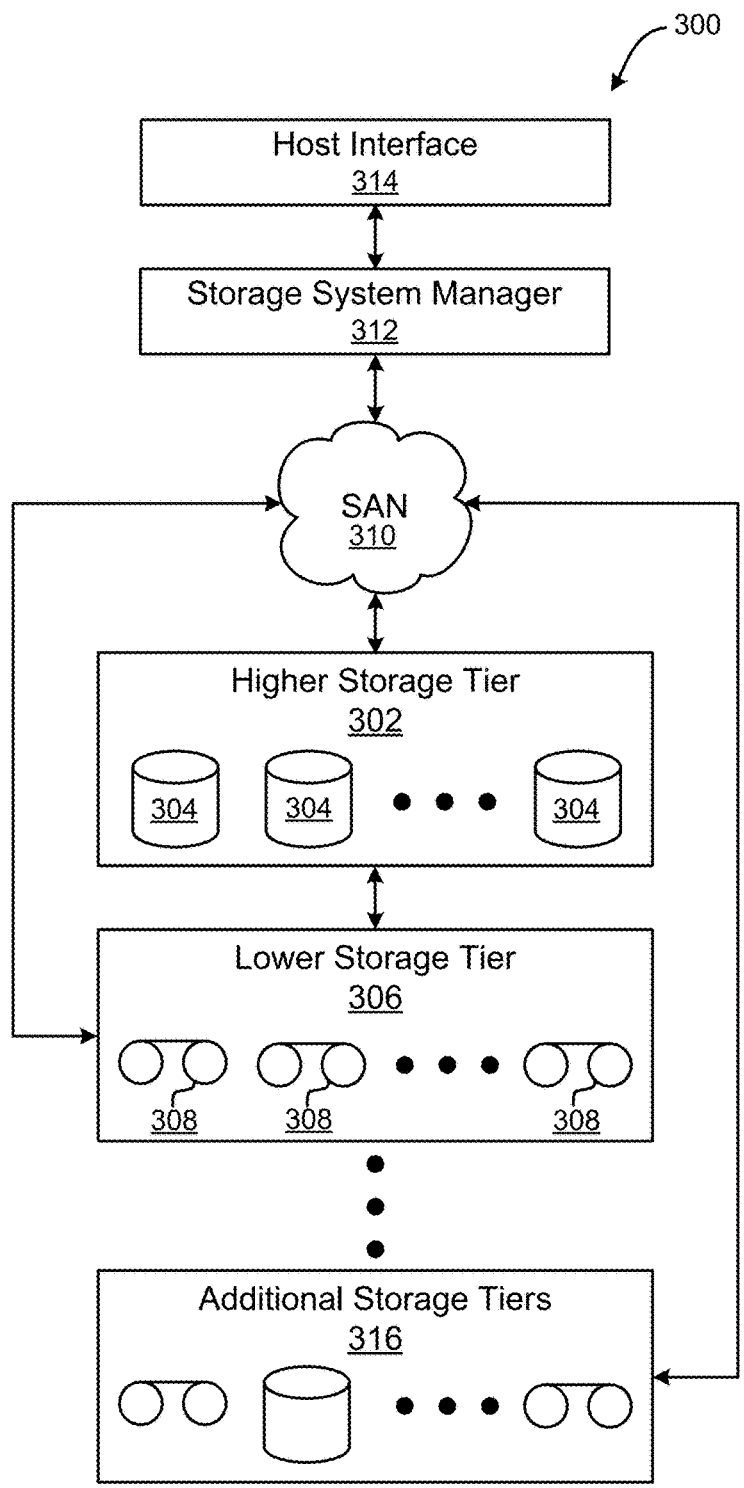
FIG. 3 illustrates a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
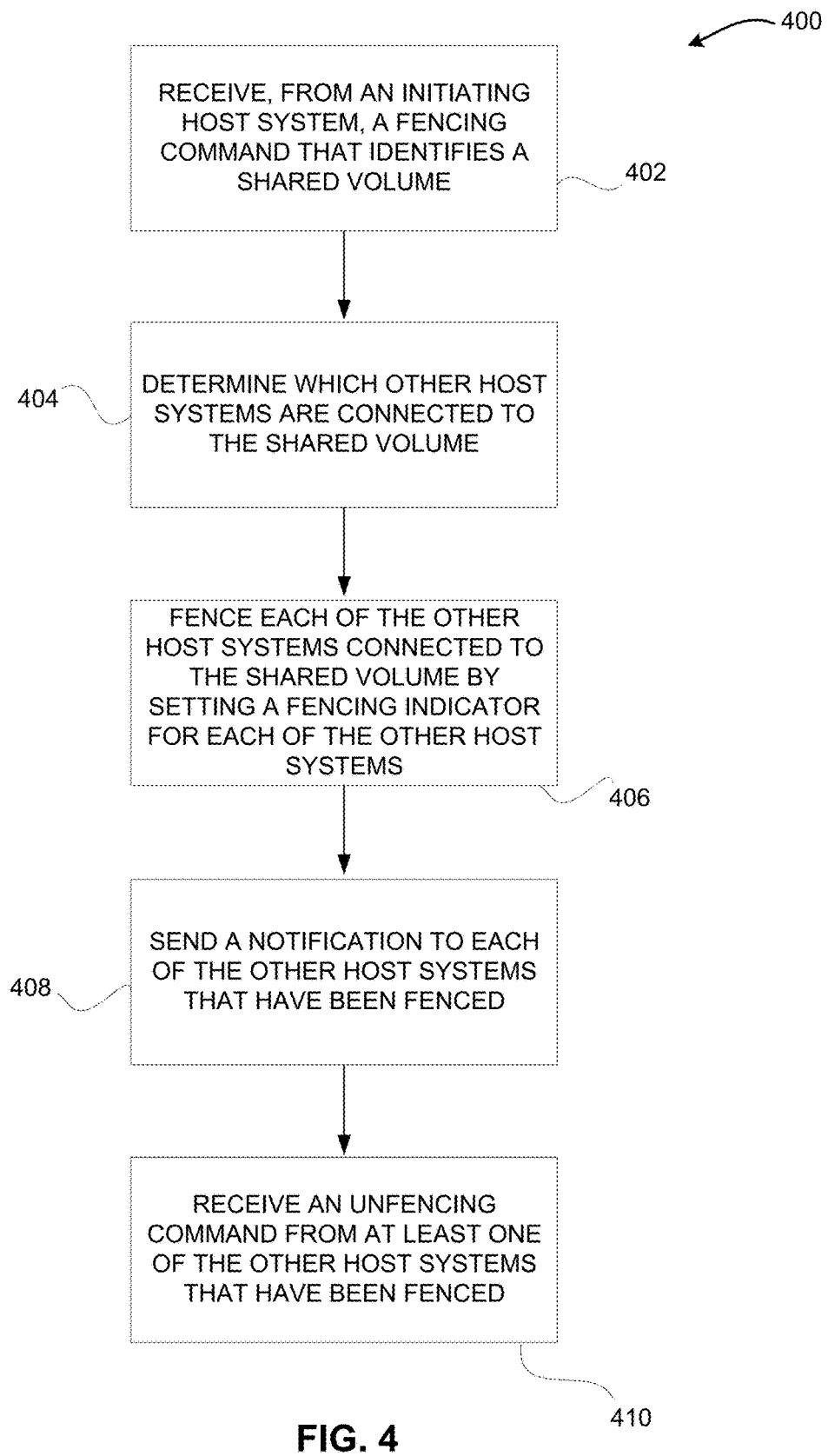
FIG. 4 illustrates a computer-implemented method for a storage controller to maintain volume integrity in a shared-resource environment, in accordance with an embodiment.

Now referring to FIG. 4, a flowchart of a computer-implemented method 400 for maintaining volume integrity in a shared-resource environment, is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by storage controller, such as the storage system manager 312 described in the context of FIG. 3, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, the method 400 initiates with operation 402, where a fencing command is received from an initiating host system. Moreover, the fencing command identifies a shared volume.

As used herein, a volume includes any storage medium associated with a logical disk. Each volume may comprise a single accessible storage area with a file system. Further, a volume may include a logical volume, where the logical volume is composed of logical partitions that are allocated onto multiple physical partitions. Accordingly, a volume may reside on one or more hard disk drives, solid state drives, tapes, etc., and the volume may be composed a plurality of extents, where each extent may be associated with a contiguous range of addressable data units within the volume.

In various embodiments, the shared volume may be a volume that is accessible to two or more host systems. The host systems may include one or more remote hosts systems that access the shared volume via a network. The initiating host system may comprise any host system connected to the shared volume and that sends the command to the storage controller. Further, a storage controller may manage access of the shared volume by the host systems. In other words, the storage controller may ensure the integrity of the data on the shared volume by mediating read/write requests directed to the shared volume from by the host systems. In one embodiment, the shared volume comprises an Extended Count-Key-Data (ECKD) volume.

In one embodiment, a fencing command comprises any command that results in a volume being fenced. Accordingly, the fencing command received from the initiating host system may include any command that results in the shared volume being fenced. Further, fencing the shared volume includes any operation that prevents any host system other than the initiating host system from accessing the shared volume. In other words, after the shared volume is fenced, no additional host systems may vary the shared volume online. Further, when the shared volume is fenced, read/write requests to the shared volume from non-initiating host systems may be rejected by the storage controller.

In some embodiments, the fencing command may include a parameter. Further, the parameter may identify the scope of an operation that the initiating host system performed on the shared volume. The operation may include a transforming operation that the initiating host system performed on the shared volume. A transforming operation may include any operation that changes the shared volume in a fundamental way. As discussed in more detail below, the scope of the operation may be utilized by host systems other than the initiating host system for determining actions that the other host systems must perform before the shared volume is again accessible to the other host systems.

At operation 404, the storage controller determines which other host systems are connected to the shared volume. In one embodiment, determining which other host systems are connected to the shared volume may include identifying which host systems have an active path group to the shared volume. For example, where the shared volume comprises an ECKD volume, then the shared volume may be made accessible to a host system by establishing a path group via one or more Set Path Group Identifier (SPID) commands. Accordingly, the storage controller may track which host systems have an active path group established to the shared volume. In one embodiment, the other host systems connected to the shared volume includes all other host systems with an active path group to the shared volume.

Next, at operation 406, the storage controller fences each of the other host systems connected to the shared volume. The other host systems connected to the shared volume are fenced by setting a fencing indicator for each of the other host systems. In one embodiment, the fencing indicators may be set utilizing a control structure.

For example, the storage controller may maintain a unique path group for each connected host system, and track the different path groups within a control structure. For each host system that is fenced, the storage controller may flag the host system within the control structure. In other words, a given host system may be fenced from a shared volume by flagging the host system's path group within a control structure of the storage controller. While the given host system's path group is flagged within the control structure, the host system's access of the shared volume will be limited (e.g., read/write requests to the shared volume from the host system will be prevented, etc.). As an option, read/write requests received from a fenced host system may be rejected by the storage controller with a unit check, such as Command Reject, Format X'0F', Status Not as Required, or a reason code, etc.

Further, the storage controller sends, at operation 408, a notification to each of the other host systems that have been fenced. As used herein, the notification to each of the other host systems may include any communication utilized to inform the other host systems that read/write access to the shared volume has been limited, and/or utilized to inform the other host systems that the shared volume has been transformed in some manner.

In one embodiment, sending the notification from the storage controller to the other host systems may include sending an interrupt to the other host systems. For example, the storage controller may send an unsolicited attention interrupt to the other host systems. Further, the interrupt from the storage controller may prompt the other host systems to access an attention message that is stored on the storage controller. An attention message includes any message residing on the storage controller that notifies a host system of its fencing status with respect to a volume. In other words, the storage controller may make pending in a buffer an attention message that identifies one or more shared volumes that are fenced, and then send an interrupt to the one or more host systems that prompts the one or more host systems to read the attention message. As discussed below, each of the other host systems that receive the interrupt may be unable to perform any further reads or writes on the shared volume until the other host system refreshes a view of the shared volume and resets its fencing condition.

In this manner, the fencing command from the initiating host system may be used to prevent other host systems from accessing a shared volume that has recently been modified in some manner by the initiating host system. Further, each of the other host systems that have been restricted from accessing the shared volume are provided notice regarding the limited access, as well as notice that the shared volume has been changed or transformed in some manner.

In one embodiment, after sending the notification to the other host systems, the storage controller may notify the initiating host system that it has sent the notification (e.g., has sent the interrupt, etc.)

Additionally, at operation 410, an unfencing command is received at the storage controller from at least one of the other systems that have been fenced. As discussed below, after one of the other host systems refreshes its view of the shared volume, the other host system may issue an unfencing command to the storage controller. The other host system may refresh its view of the shared volume in response to receiving a fencing notification indicating that the other host system is fenced.

In one embodiment, the unfencing command received at the storage controller includes any communication that results in the storage controller unfencing the host system that sent the unfencing command. For example, upon receiving the unfencing command from the host system, the storage controller may reset or delete a fencing indicator for the host system. In particular, where the fencing indicator comprises a flag within a control structure of the storage controller, a given host system may be unfenced from the shared volume by resetting or removing a flag associated with the host system's path group within the control structure.

In various embodiments, where two or more host systems have been fenced from a shared volume by a storage controller, each fenced host system is responsible for resetting its respective fence before the storage controller will allow it to resume access of the shared volume. In other words, a given host system's unfencing command to the storage controller may only be effective for unfencing the given host system, and not for unfencing any other host systems that are also fenced due to the fencing command received at operation 402. Accordingly, operation 410 may include receiving a different unfencing command from two or more of the other host systems that were fenced at operation 406, or from each of the other host systems that were fenced at operation 406.

Figure 5A:
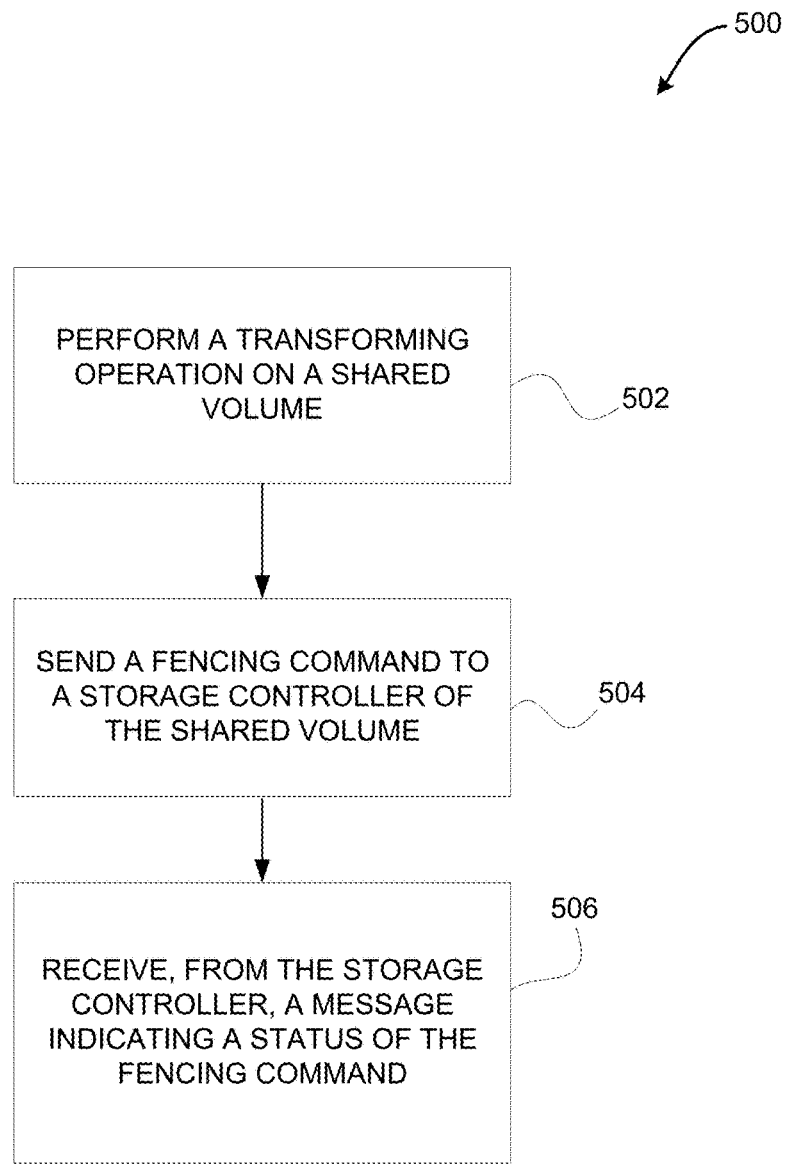
FIG. 5A illustrates a computer-implemented method for an initiating host system to maintain volume integrity in a shared-resource environment, in accordance with another embodiment.

Now referring to FIG. 5A, a flowchart of a computer-implemented method 500 for maintaining volume integrity in a shared-resource environment, is shown according to one embodiment. The method 500 may be performed in accordance with the present invention in any of the environments depicted in FIGS. 1-3, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by an initiating host system, such as the data server 114 described within the context of FIG. 1, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, the method 500 initiates with operation 502, where an initiating host performs a transforming operation on a shared volume. As used herein, a transforming operation includes any operation that changes the shared volume in a fundamental way.

As an option, the transforming operation may include an initialization of a file directory, after which previously existing files on the shared volume are no longer available. As another option, the transforming operation may include moving a file directory, after which previously existing files of the directory may remain, however the directory will be moved to a new location on the shared volume. As yet another option, the transforming operation may include a copy operation or a restore full volume operation, after which previously existing files on the shared volume may be replaced with a new set of files, and/or a file directory may be moved on the shared volume. As one option, the transforming operation may include an operation that restores an existing file, such that a different version of the file is restored in place. Additionally, the transforming operation may include moving an existing file, such that a same version of the file is moved to a new location on the shared volume.

Additionally, the initiating host sends, at operation 504, a fencing command to a storage controller of the shared volume. In one embodiment, the initiating host system may send the fencing command in response to a completion of the transforming operation. Further, the fencing command may identify the shared volume that was targeted by the transforming operation.

As noted above, the fencing command comprises any command that results in the shared volume being fenced. Further, fencing the shared volume includes any operation that prevents any host system other than the initiating host system from accessing the shared volume. When the shared volume is fenced, read/write requests to the shared volume from host systems other than the initiating host system may be rejected by the storage controller.

In some embodiments, the fencing command may include a parameter. Further, the parameter may identify the scope of the transforming operation that the initiating host system performed on the shared volume. In one embodiment, the fencing command may comprise an OS data management subsystem command. For example, the command may comprise a z/OS Data Facility Storage Management Subsystem (DFSMS) command.

Further, at operation 506, a message is received from the storage controller, where the message indicates a status of the fencing command. In one embodiment, the message from the storage controller may indicate that all host systems connected to the shared volume have been fenced.

For example, the message from the storage controller may indicate that all of the other host systems with an active path group to the shared volume have been fenced. In some instances, the message from the storage controller may indicate that the storage controller was unable to fence all of the other host systems with a path group to the shared volume.

In this manner, the initiating host may be able to prevent a plurality of host systems that are connected to a shared volume from accessing the shared volume after the initiating host system has changed the contents of the shared volume, thereby preventing potential data loss. Further, the initiating host system may be able to prevent the access of the other host systems without being aware of how many other host systems are connected to the shared volume. Similarly, the initiating host may be able to prevent the access of the other host systems connected to the shared volume without being aware of the identities of the other host systems that are connected to the shared volume, or the operating systems or applications running on such other host systems.

In one embodiment, the initiating host system may issue to the storage controller a reserve command for the shared volume prior to performing, at operation 502, the transforming operation on the shared volume. When the shared volume is reserved due to the reserve command, read/write access to the shared volume may be prevented.

In particular, when the shared volume is reserved due to the reserve command, read/write access attempts to the shared volume may timeout. In such an embodiment, after the transforming operation completes, and the initiating host system has received a message from the storage controller indicating that the fencing command has completed successfully, the initiating host system may release the reserve. In other words, the initiating host system may release the reserve after the other host systems have been fenced. In this manner, the initiating host system may use a reserve command to prevent other host systems from accessing the shared volume during the initiating host system's execution of a transforming operation, and then use a fencing command, after the transforming operation completes, to prevent other host systems from accessing the shared volume with a stale view of the shared volume.

Figure 5B:
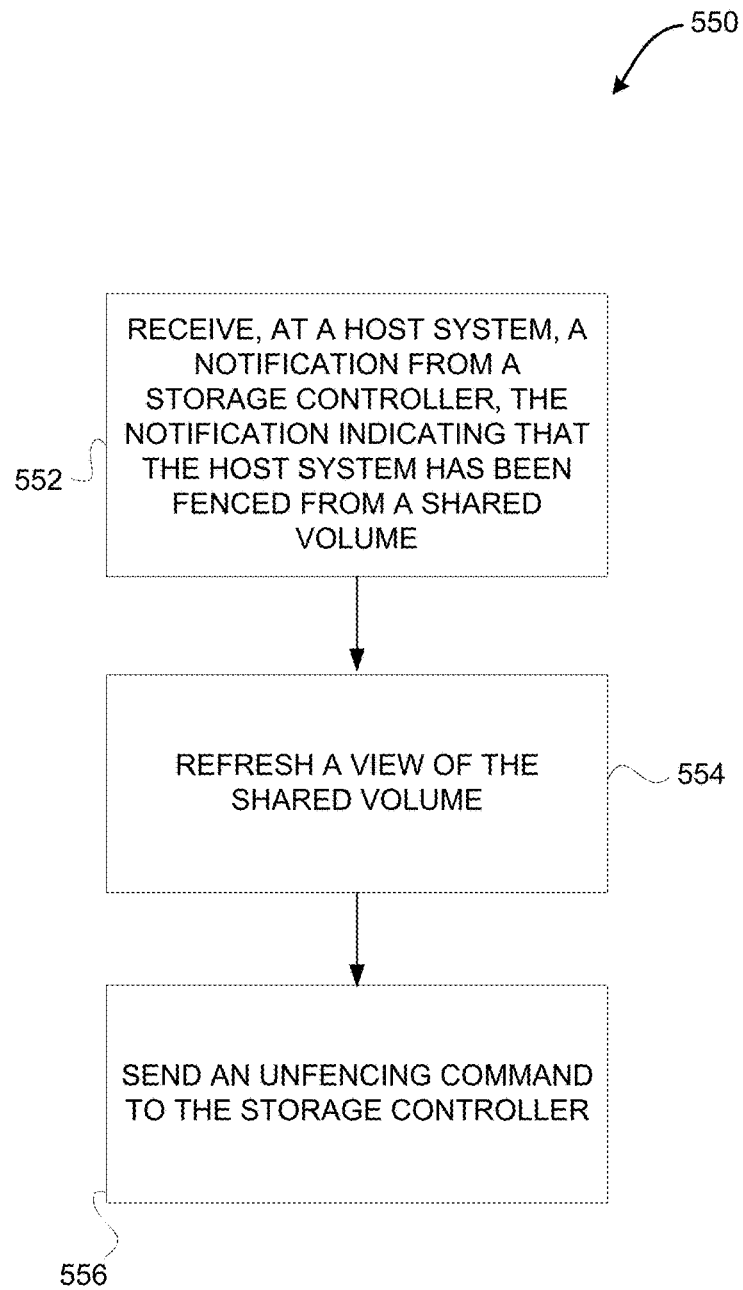
FIG. 5B illustrates a computer-implemented method for a non-initiating host system to maintain volume integrity in a shared-resource environment, in accordance with yet another embodiment.

Now referring to FIG. 5B, a flowchart of a computer-implemented method 550 for maintaining volume integrity in a shared-resource environment, is shown according to one embodiment. The method 550 may be performed in accordance with the present invention in any of the environments depicted in FIGS. 1-3, among others, in various embodiments. Of course, more or less operations than those specifically described in FIG. 5B may be included in method 550, as would be understood by one of skill in the art upon reading the present descriptions.

Each of the steps of the method 550 may be performed by any suitable component of the operating environment. For example, in various embodiments, the method 550 may be partially or entirely performed by a host system, such as the data server 114 described within the context of FIG. 1, or some other device having one or more processors therein. The processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5B, the method 550 initiates with operation 552, where a host system receives a notification from a storage controller. Additionally, the notification from the storage controller indicates that the host system has been fenced from a shared volume. The host system may be fenced from the shared volume because another host system, referred to herein as an initiating host system, has issued a fencing command to the storage controller for the shared volume. In various embodiments, each host system may be separate instance of a server, such as the data server 114 described within the context of FIG. 1.

In one embodiment, receiving the notification from the storage controller may include receiving an interrupt sent from the storage controller. For example, the host system may receive an unsolicited attention interrupt sent from the storage controller. Additionally, receiving the notification from the storage controller may include accessing an attention message in response to receiving the interrupt from the storage controller. In other words, the host system may receive an interrupt from a storage controller, and in response access an attention message that is pending on the storage controller. The attention message may be stored within a buffer of the storage controller. The attention message may inform the host system that it has been fenced from the shared volume. As an option, when a host system is presented with a fencing attention message, an End of Sense Exit will notify the host system's OS that the shared volume requires validation.

In some embodiments, the notification from the storage controller may include the scope of an operation that an initiating host system performed on the shared volume. For example, the notification from the storage controller may identify that an initiating host system has initialized a file directory, moved a file directory, performed a copy operation, a restoration operation, or moved a file, etc. The scope of the operation performed by the initiating host system may be included in an attention message on the storage controller that is accessed by the other host system. As an option, the scope of the operation may be included in sense bytes of the attention message. In this way, the other host system may be made aware of why the fencing operation occurred, and/or a degree of change of the shared volume.

Without a current view of the shared volume, any I/O directed to the shared volume may result in corruption or other damage to data on the shared volume. Accordingly, in one embodiment, in response to receiving the notification indicating that the host system is fenced from the shared volume, the host system may notify applications and/or components of the host system that access of the shared volume is currently prevented, and/or may take one or more local actions to prevent the applications and/or components of the host system from issuing I/O requests directed to the shared volume. Any notification provided to the applications and/or components of the host system may be based on the scope of an operation that the initiating host system performed on the shared volume.

In this manner, while a storage controller is configured to prevent a given host from performing read/write requests on a shared volume, software on the given host system may also be configured to prevent applications and/or components of the given host system from issuing I/O requests directed to the shared volume. In such an embodiment, any I/O requests directed to the shared volume from applications and/or components of a host system may be rejected, failed, and/or re-queued by the host system. As an option, the I/O requests may be rejected, failed, and/or re-queued by the host system based on state information in one or more control blocks of the host system, where the state information is updated by the host system when it receives a notification indicating that it has been fenced from the shared volume.

In one embodiment, an application or component of a host system may be terminated by the host system if the application or component issues a predetermined threshold number of I/O requests that are rejected, failed, and/or re-queued.

At operation 554, the host system refreshes a view of the shared volume. In one embodiment, the host system may refresh the view of the shared volume in response to receiving the notification that it is fenced. As used herein, refreshing the view of the shared volume includes any operation that updates control blocks of the host system, where such control blocks are used to access the shared volume. In one embodiment, refreshing the view of the shared volume includes recovering the shared volume. For example, the shared volume may be validated by a host system, and/or in-memory information regarding the shared volume may be refreshed at the host system.

In one embodiment, during a refresh of the view of the shared volume, a host system may locate a data structure on the shared volume. The data structure on the shared volume may provide a mechanism to locate data sets that reside in the shared volume. In one embodiment, the data structure may include a Volume Table Of Contents (VTOC) of the shared volume. After locating the data structure on the shared volume, the host system may update its control blocks. Thereafter, by using the updated control blocks, components of the host system may be able to identify relocated data sets within the shared volume, and re-open, from a new location, previously opened data sets. As an option, the updated control blocks may contain information such as locations of file directories on the shared volume and/or or cached copies of directories or file records.

In some embodiments, refreshing a view of the shared volume includes removing and/or re-establishing paths. Moreover, refreshing a view of the shared volume may include refreshing a Unit Control Block (UCB) of a host system, including VTOC location and a serial of the shared volume.

If a host system includes open allocations of a shared volume, then validation of the shared volume may fail. In such a scenario, the shared volume may remain fenced, and a user, such as an administrator, may be required to resolve such an issue. For example, the user may need to quiesce or close an application before the shared volume can be re-validated by the host system.

In this manner, host systems connected to a shared volume that has been transformed by an initiating host system may be forced to perform a re-initialization sequence before the host systems are allowed to resume access of the shared volume.

As an option, a host system's refresh of its view of the shared volume may be based on the scope of an operation that the initiating host system performed on the shared volume. In other words, a non-initiating host system may determine, utilizing the scope of the operation performed by the initiating host system, which actions are necessary for the non-initiating host system to again obtain read/write access of the shared volume.

For example, if the initiating host system moved a directory, then one or more other host systems may re-read a volume label to identify a location of the moved directory on the shared volume. Further, after identifying the location of the moved directory, the one or more other host systems may refresh control blocks used for tracking where directories reside on the shared volume. As another example, if the initiating host system dynamically expanded the shared volume, then the other host systems may refresh their views of the shared volume in a manner different than the refresh performed for identifying a location of a moved directory.

In some embodiments, after a host system has refreshed its view of a shared volume, the host system may cancel or terminate an application or component of the host system that is unable to update in-memory information with the refreshed view of the shared volume. In other words, if a host system has refreshed its view of a shared volume, and an application or component of the host system will attempt to access the shared volume using stale information, then the application or component may be terminated to avoid corruption of data on the shared volume.

Still yet, at operation 556, the host system sends an unfencing command to the storage controller. In one embodiment, the unfencing command sent to the storage controller includes any communication that results in the storage controller unfencing the host system. For example, upon receiving the unfencing command from the host system, the storage controller may reset or delete a fencing indicator for the host system. In particular, where the fencing indicator comprises a flag within a control structure of the storage controller, a given host system may be unfenced from the shared volume by resetting or removing a flag associated with the host system's path group within the control structure.

In various embodiments, where two or more host systems have been fenced from a shared volume by a storage controller, each fenced host system will need to reset its respective fence before the storage controller will allow it to resume access of the shared volume. In other words, a given host system's unfencing command to the storage controller may only be effective for unfencing the given host system, and not any other host systems that are also be fenced due to the same or different fencing commands.

In various embodiments, if a given host system has previously taken one or more local actions to prevent applications and/or components of the host system from issuing I/O directed to the shared volume, then such actions may be reversed after the host system is no longer fenced from the shared volume. For example, after a given host system refreshes a view of the shared volume at operation 554, or sends the unfencing command to the storage controller at operation 556, software of the host system, such as an OS, may then allow applications and/or components of the host system to issue I/O directed to the shared volume.

Accordingly, by way of sending an unfencing command to the storage controller, a fenced host system may reset the fencing of itself from the shared volume. After the host system resets its fencing status with the storage controller, the storage controller may then allow the host system read/write access of the shared volume. Once the storage controller grants the host system read/write access of the shared volume, applications and components of the host system may resume normal operational use of the shared volume.

The embodiments disclosed herein provide systems and methods for preventing host systems from accessing a shared resource after the shared resource has been modified in some manner by an initiating host system. In particular, a storage controller may receive a command sent by an initiating host system that has modified a shared volume. Thereafter, the storage controller may prevent other host systems from accessing the shared volume until the other host systems have recovered the shared volume in some manner. For example, the other host systems may need to refresh a view of the shared volume, validate the shared volume, and/or refresh in-memory information regarding the shared volume.

In this manner, data corruption and data loss may be prevented on a volume in a shared-resource environment. By way issuing of a fencing command, an initiating host system that has performed a transforming operation on a shared volume may prevent other host systems from accessing the shared volume until each of the other host systems have updated in-memory control structures utilized by the host system for accessing the shared volume.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for maintaining volume integrity in a shared-resource environment, the computer program product comprising a computer readable storage medium having program instructions embodied therewith, the program instructions executable by a storage controller to cause the storage controller to:
    receive, by the storage controller from an initiating host system, a fencing command that identifies a shared volume and includes a parameter identifying a scope of an operation performed on the shared volume;
    determine, by the storage controller, a plurality of host systems that are connected to the shared volume;
    set, by the storage controller, a fencing indicator for each of the plurality of host systems, where the fencing indicator limits access to the shared volume by the plurality of host systems, and where the fencing indicator is not set for the initiating host system;
    send, by the storage controller, a notification to each of the plurality of host systems, where the notification includes the parameter and informs the plurality of host systems that the access to the shared volume is limited;
    receive, by the storage controller, an unfencing command from one or more of the plurality of host systems; and
    reset or remove the fencing indicator for each of the one or more of the plurality of host systems from which the unfencing command is received.

2. The computer program product of claim 1, wherein determining the plurality of host systems that are connected to the shared volume includes identifying the plurality of host systems that have an active path group to the shared volume.

3. The computer program product of claim 2, wherein the plurality of host systems connected to the shared volume includes all host systems that have an active path group to the shared volume.

4. The computer program product of claim 2, wherein each of the plurality of host systems are fenced by setting a fencing indicator within a control structure of the storage controller.

5. A computer-implemented method, comprising:
    receiving, by the storage controller from an initiating host system, a fencing command that identifies a shared volume and includes a parameter identifying a scope of an operation performed on the shared volume;
    determining, by the storage controller, a plurality of host systems that are connected to the shared volume;
    setting, by the storage controller, a fencing indicator for each of the plurality of host systems, where the fencing indicator limits access to the shared volume by the plurality of host systems and where the fencing indicator is not set for the initiating host system;
    sending, by the storage controller, a notification to each of the plurality of host systems, where the notification includes the parameter and informs the plurality of host systems that the access to the shared volume is limited;
    receiving, by the storage controller, an unfencing command from one or more of the plurality of host systems; and
    resetting or removing the fencing indicator for each of the one or more of the plurality of host systems from which the unfencing command is received.

6. The computer-implemented method of claim 5, wherein determining the plurality of host systems that are connected to the shared volume includes identifying the plurality of host systems that have an active path group to the shared volume.

7. The computer-implemented method of claim 6, wherein the plurality of host systems connected to the shared volume includes all host systems that have an active path group to the shared volume.

8. The computer-implemented method of claim 5, wherein each of the plurality of host systems are fenced by setting the fencing indicator within a control structure of the storage controller.

9. A system, comprising:
    a processor and logic integrated with and/or executable by the processor, the logic being configured to cause the processor to:
        receive, by the storage controller from an initiating host system, a fencing command that identifies a shared volume and includes a parameter identifying a scope of an operation performed on the shared volume;
        determine, by the storage controller, a plurality of host systems that are connected to the shared volume;
        set, by the storage controller, a fencing indicator for each of the plurality of host systems, where the fencing indicator limits access to the shared volume by the plurality of host systems, and where the fencing indicator is not set for the initiating host system;

send, by the storage controller, a notification to each of the plurality of host systems, where the notification includes the parameter and informs the plurality of host systems that the access to the shared volume is limited;

receive, by the storage controller, an unfencing command from one or more of the plurality of host systems; and reset or remove the fencing indicator for each of the one or more of the plurality of host systems from which the unfencing command is received.

10. The system of claim 9, wherein determining the plurality of host systems that are connected to the shared volume includes identifying the plurality of host systems that have an active path group to the shared volume.

11. The system of claim 10, wherein the plurality of host systems connected to the shared volume includes all host systems that have an active path group to the shared volume.

12. The system of claim 9, wherein each of the plurality of host systems are fenced by setting the fencing indicator within a control structure of the storage controller.

13. A computer program product for maintaining volume integrity in a shared-resource environment, the computer program product comprising a computer readable storage medium having program instructions embodied therewith, the program instructions executable by a processor to cause the processor to:

perform, by an initiating host system, an operation on a shared volume;

send a fencing command from the initiating host system to a storage controller of the shared volume, the fencing command including a parameter identifying the shared volume as well as a scope of the operation performed on the shared volume; and receive, at the initiating host system from the storage controller, a message indicating a status of the fencing command, the status including an indication that each of a plurality of host systems that are connected to the shared volume, except for the initiating host system, have been given limited access to the shared volume.

14. The computer program product of claim 13, wherein the operation includes at least one of: an initialization of a file directory, moving a file directory, a copy operation, a restore full volume operation, a file restore operation, and a file move operation.

15. The computer program product of claim 13, wherein the fencing command is sent to the storage controller in response to a completion of the operation.

16. A computer program product for maintaining volume integrity in a shared-resource environment, the computer program product comprising a computer readable storage medium having program instructions embodied therewith, the program instructions executable by a processor to cause the processor to:

receive, at a host system, a notification from a storage controller, the notification indicating that access to a shared volume by the host system has been limited, as well as a parameter identifying a scope of a transforming operation performed on the shared volume by an initiating host system;

prevent I/O requests from the host system to the shared volume, in response to the notification;

refresh a view of the shared volume by the host system, based on the scope of the transforming operation performed on the shared volume; and send an unfencing command from the host system to the storage controller.

17. The computer program product of claim 16, comprising program instructions for causing the processor to:

in response to receiving the notification from the storage controller, notify at least one component of the host system that access of the shared volume is currently prevented.

18. The computer program product of claim 17, wherein receiving the notification from the storage controller includes receiving an interrupt sent from the storage controller and accessing an attention message in response to receiving the interrupt.

19. The computer program product of claim 18, wherein the attention message is stored within a buffer of the storage controller.

20. The computer program product of claim 18, wherein refreshing the view of the shared volume includes updating control blocks of the host system, and wherein the control blocks are used by the host system to access the shared volume.

* * * * *